United States Patent
Lindberg et al.

(10) Patent No.: US 11,354,041 B2
(45) Date of Patent: Jun. 7, 2022

(54) READ LATENCY REDUCTION THROUGH COMMAND AND POLLING OVERHEAD AVOIDANCE

(71) Applicant: WESTERN DIGITAL TECHNOLOGIES, INC., San Jose, CA (US)

(72) Inventors: Todd Lindberg, Phoenix, AZ (US); Robert Ellis, Phoenix, AZ (US); Kevin O'Toole, Chandler, AZ (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 106 days.

(21) Appl. No.: 16/899,923

(22) Filed: Jun. 12, 2020

(65) Prior Publication Data
US 2021/0389878 A1    Dec. 16, 2021

(51) Int. Cl.
*G06F 13/16*    (2006.01)
*G06F 3/06*    (2006.01)

(52) U.S. Cl.
CPC .......... *G06F 3/0611* (2013.01); *G06F 3/0659* (2013.01); *G06F 3/0673* (2013.01); *G06F 13/1668* (2013.01)

(58) Field of Classification Search
CPC .... G06F 3/0611; G06F 3/0659; G06F 3/0673; G06F 13/1668
USPC ........................................................ 711/154
See application file for complete search history.

(56) References Cited

U.S. PATENT DOCUMENTS

| | | | |
|---|---|---|---|
| 7,180,906 B1* | 2/2007 | Dwork ................... | H04L 12/42 370/449 |
| 8,433,845 B2 | 4/2013 | Borchers et al. | |
| 8,560,764 B2 | 10/2013 | Huffman et al. | |
| 8,977,833 B2 | 3/2015 | Kazui et al. | |
| 9,036,431 B2* | 5/2015 | Kim ........................ | G11C 8/10 365/189.14 |
| 9,304,691 B2 | 4/2016 | Ide et al. | |
| 9,620,182 B2 | 4/2017 | Tuers et al. | |
| 9,723,098 B2* | 8/2017 | Shabtai ................... | H04L 67/06 |
| 9,910,600 B2 | 3/2018 | Buxton et al. | |
| 10,949,115 B2* | 3/2021 | Sun ........................ | G06F 3/0611 |
| 2009/0089492 A1* | 4/2009 | Yoon ..................... | G06F 3/0604 711/103 |
| 2014/0347942 A1* | 11/2014 | Kim ........................ | G11C 16/10 365/193 |

(Continued)

*Primary Examiner* — Christopher B Shin
(74) *Attorney, Agent, or Firm* — ArentFox Schiff LLP

(57) ABSTRACT

Aspects of a storage device including a memory and a controller are provided which allow for reduction of latency and improve QoS for reads performed in memory locations such as multi-plane dies sharing a bus with the controller. When the controller receives a host read command, the controller sends a read sense command to a memory location to perform a read operation. The controller also sends a status polling command to the memory location to check die status. While the read operation is being performed, and while other read operations are being performed in other memory locations, the controller refrains from polling this memory location and the other memory locations for die status. Rather, the controller continuously toggles a read enable input to the memory location until the read operation is complete and the die status is ready, after which the controller receives data from the memory location.

19 Claims, 9 Drawing Sheets

(56) References Cited

U.S. PATENT DOCUMENTS

| | | | | |
|---|---|---|---|---|
| 2015/0187399 A1* | 7/2015 | Tuers | ............... | G06F 13/1689 |
| | | | | 711/103 |
| 2015/0221381 A1* | 8/2015 | Nam | ............... | G11C 16/0483 |
| | | | | 365/185.12 |
| 2015/0310916 A1* | 10/2015 | Leem | ............... | G11C 7/1093 |
| | | | | 711/103 |
| 2016/0292092 A1* | 10/2016 | Gavens | ............... | G06F 13/4068 |
| 2016/0357454 A1* | 12/2016 | Lee | ............... | G06F 13/385 |
| 2016/0365127 A1* | 12/2016 | Chun | ............... | G11C 7/20 |
| 2018/0151237 A1* | 5/2018 | Lee | ............... | G11C 16/3459 |
| 2019/0198120 A1* | 6/2019 | Handa | ............... | G11C 7/106 |
| 2020/0241795 A1* | 7/2020 | Yang | ............... | G06F 3/0679 |
| 2021/0216248 A1* | 7/2021 | Kanamori | ............... | G11C 16/10 |

* cited by examiner

READ LATENCY REDUCTION THROUGH COMMAND AND POLLING OVERHEAD AVOIDANCE

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

When reading data from cells of the flash memory in response to a read command from a host device, a controller of the flash storage device may identify the physical address of a block associated with a logical address. The controller may then send a command to a die including the identified physical address to sense the data in the block into a number of data latches. While the data is being sensed, the controller may periodically send commands to check the die status (e.g. busy or ready). When the die status is busy, the controller may determine that data is still being sensed, and so the controller may in the interim communicate with other dies to perform other operations (including sending other commands to check respective die statuses). When the die status is ready, the data has been sensed into the latches, and so the controller may send another command to the die to transfer the sensed data from the latches to the controller. The controller may then send the transferred data to the host device.

However, performing reads in such manner may impose significant latencies when the controller communicates with multiple dies over a shared bus. For example, when the controller periodically sends commands to check die status, the controller may communicate with the dies in a round robin manner. For instance, if three dies are executing read commands in parallel (e.g. the dies are each simultaneously sensing data into blocks in response to three different read commands), the controller may poll for die status by sending a status command to die 1, followed by a status command to die 2 if die 1 is busy, followed by a status command to die 3 if die 2 is busy, followed by a status command again to die 1 if die 3 is busy, and so forth in circular fashion until one of the dies is ready to transfer data. As a result, if die 1 happens to finish sensing data shortly after the status check for die 1, the controller may not be aware that die 1 is ready for transfer until the controller has completed sending status commands to dies 2 and 3. Such status polling delay may be further increased when the number of dies in the storage device is large, and when each die includes multiple planes in which the controller may perform parallel read operations. For example, if the flash storage device includes 32 dies each with four planes that are each performing a respective read operation (i.e. 128 simultaneous read senses), then in a worst-case scenario, the controller may not be aware that a given die is ready for transfer until after issuing 127 subsequent status commands. Moreover, even after a die is ultimately determined to be ready, a further delay may result while the controller issues a transfer command to that die to receive the sensed data, overall resulting in significant read latency and reduced quality of service (QoS).

SUMMARY

One aspect of a storage device is disclosed herein. The storage device includes a memory comprising a plurality of memory locations, and a controller. The controller is configured to perform a read operation in one of the memory locations, to refrain from polling any of the other memory locations while the read operation is being performed, and to continuously toggle a read enable input to the one of the memory locations until the read operation is complete.

Another aspect of a storage device is disclosed herein. The storage device includes a memory comprising a plurality of memory locations, and a controller. The controller is configured to send a read sense command to one of the memory locations, to refrain from sending a status polling command to any of the other memory locations during execution of the read sense command, and to continuously toggle a read enable input to the one of the memory locations until the execution of the read sense command is complete.

A further aspect of a storage device is disclosed herein. The storage device includes a memory comprising a plurality of memory locations, and a controller. The controller is configured to send a read sense command to one of the memory locations, to refrain from sending a status polling command to any of the other memory locations while the one of the memory locations is in a busy state, and to continuously toggle a read enable input to the one of the memory locations until the one of the memory locations is no longer in the busy state.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
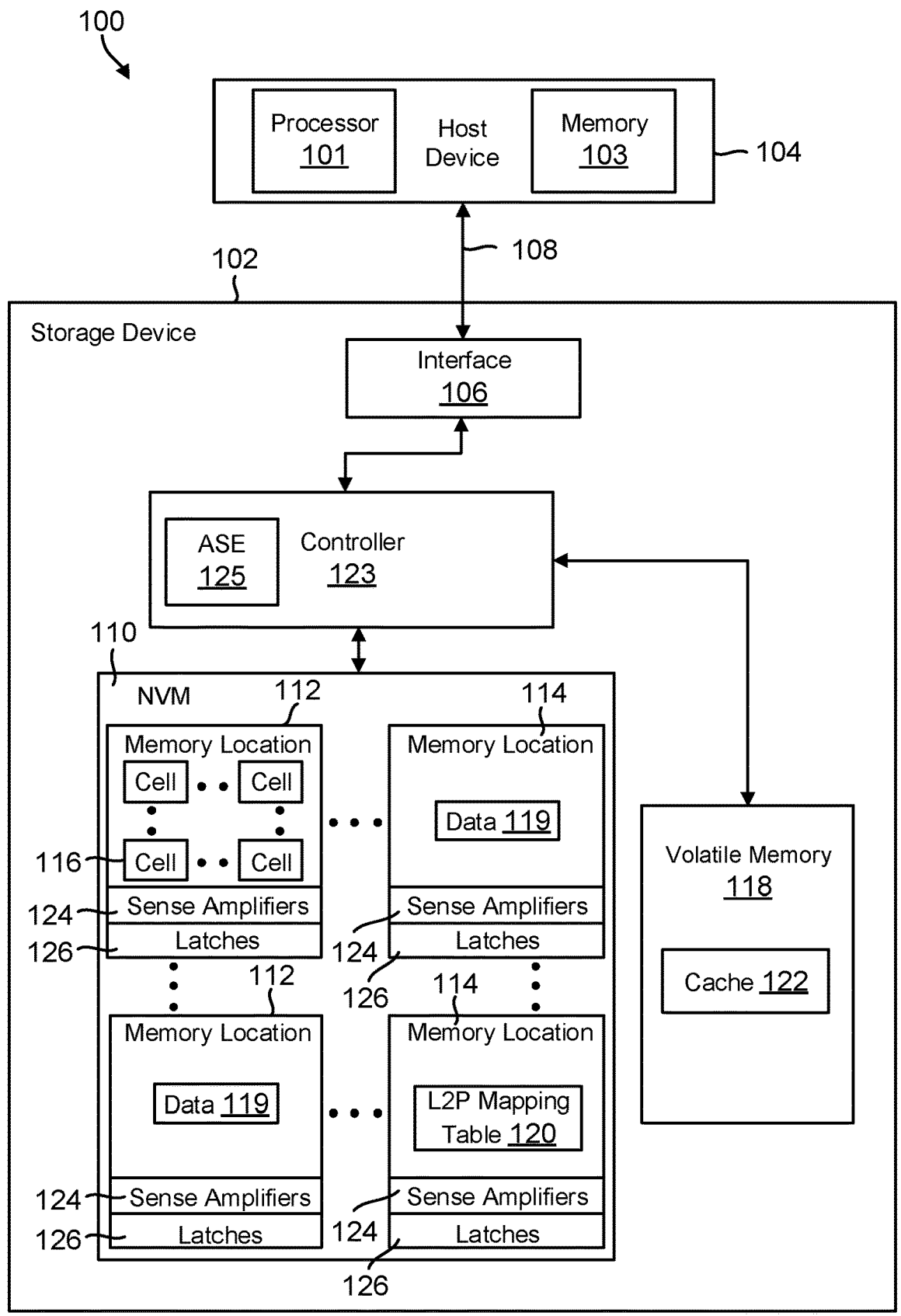
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

When a controller of the storage device reads data from memory, for example, cells of a die, the controller may issue a read sense command to the die to sense the data into data latches coupled to the cells. Where the die includes multiple planes, the controller may issue multiple read sense commands to the die to read the data from each plane in parallel. Moreover, where the storage device includes multiple dies sharing a same bus with the controller, the controller may similarly send read sense commands to each die to simultaneously sense data from each plane in response to different read commands.

While each die is performing one or more read operations in response to respective read sense commands (e.g. sensing respective data into the data latches from one or more planes), the controller may send status polling commands to individual dies to determine whether a respective die has finished processing a respective read command. If the die is busy processing one read sense command, i.e. the die is in a busy state, the controller may send another status polling command to the same die for a different plane, or to a different die, to determine whether the respective die is finished processing another read command. The controller may send status polling commands to the individual dies in a round robin manner. For example, if the storage device includes 32 dies each having two planes processing respective read sense commands in parallel, the controller may send 64 different status polling commands to the dies in circular fashion, e.g. one status polling command to die 1 for plane 1, followed by another status polling command to die 1 for plane 2, followed by another status polling command to die 2 for plane 1, etc. up until die 32, and then back again to die 1. The controller may continue to send status polling commands in such manner until the controller determines that a respective die has finished processing a respective read command, i.e. the die is in a ready state. When the controller determines that a die is ready for another command (e.g. the data has been sensed into the latches in a respective plane), the controller may send a transfer command to the die to transfer the sensed data to the controller.

Generally, the controller may send status polling commands to busy dies as part of a background task or operation. For instance, if multiple dies are processing individual read sense commands in parallel, the controller may in the background send status polling commands to each of the dies according to each die's respective position in a status polling queue. For example, the dies may be placed in the queue in an order corresponding to the order of read commands received from the host device, in the order of read sense commands transmitted to the dies, in an order corresponding the order of identifiers of the dies (e.g. die 1, die 2, etc.), or in some other order. Thus, if the controller receives read commands for ten dies 1-10 such that die 10 is last in the status polling queue in one example, the controller may send status polling commands to check each die 1-9 before finally sending a status polling command to die 10. Assuming in a worst-case scenario that die 10 has finished sensing data at the time the controller is inquiring the status of die 1, and assuming that the firmware overhead or amount of time to issue each status polling command for a die is 2 µs, then a delay of 20 µs may result before the controller finally determines that die 10 is ready to transfer the sensed data. When the number of dies containing multiple planes is large (e.g. 32 or more dies each having 4 or more planes), the number of status polling commands that may be sent may be significant (e.g. 128 or more commands), thus further increasing the overall latency for completing one read command. Moreover, since the background processing order and timing of status polling commands may be irrespective of command or data priority, the die may still be subject to the same significant read latency described above even if a die is processing a high priority read command indicated by the host device, thus reducing the QoS of the storage device.

Accordingly, the storage device described in the present disclosure reduces the read latency imposed by such background status polling. For example, after the controller receives a read command for data in a plane of a particular die (e.g. a high priority read command indicated by a host device), the controller may send a read sense command to that die. When the die shares a bus with other dies that are busy performing read operations, then to reduce polling delays, the controller may refrain from sending status polling commands to the other dies while the die is busy performing a read operation. For instance, the controller may adjust the background status polling such that a status polling command is sent only to a given die for a given plane (e.g. a plane storing high priority data or a plane that is first in the status polling queue) and paused for other dies and other planes. The controller may also pause other background operations (e.g. read transfers or new commands) such that the shared bus only includes foreground communication between the controller and the given die for the given plane.

After the controller sends an initial status polling command and while that die is busy sensing data in response to the read sense command, the controller may toggle a read enable input (e.g. RE) of the given die to read the die status. Although the controller may send periodic status polling commands after the initial status polling command to the given die for the given plane to periodically read die status while the die is busy sensing data, such approach may result in additional read latency (e.g. a 1 μs delay may exist between subsequent status polling commands). Therefore, to further reduce polling command delays, the controller may also refrain from sending periodic status polling commands to the given die and plane while the die is in a busy state, and instead continuously toggle the RE to read the die status repeatedly after sending the initial status polling command until the die is in a ready state. Moreover, after determining the die is in the ready state and to reduce additional transfer delays in issuing a subsequent transfer command to the die, the controller may indicate to the die as part of another command (e.g. the read sense command or the initial status polling command) to transfer the data to the controller when the die is in the ready state. When the read command has been fully executed, the controller may resume the background status polling (or other background operations) to allow for subsequent communication between the controller and the die for other planes, as well as for communication between the controller and the other dies on the shared bus. In this way, read latency may be reduced and QoS improved.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a buffer (e.g. a write buffer or a read buffer) for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
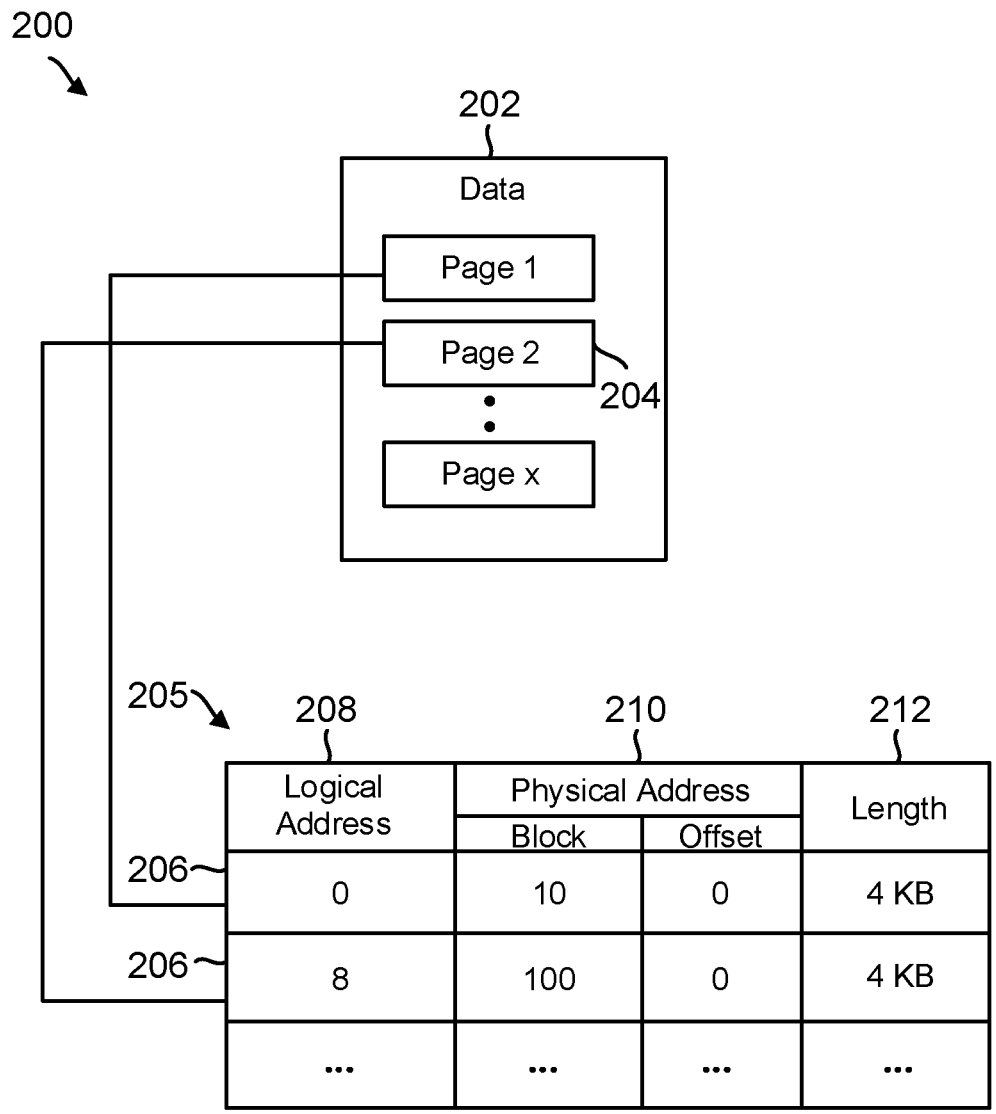
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 is further configured to determine the ready or busy status of each memory location 112. For example, the controller 123 may include an asynchronous status engine (ASE) 125 that is configured to send status polling commands to the memory locations 112 (e.g. the dies 114 or planes). The ASE 125 may be a component of the controller 123 that is implemented in the one or more processors of the controller or in other circuitry of the controller. While an example of a single ASE that sends status polling commands to all of the memory locations 112 is illustrated in the exemplary embodiment of FIG. 1 and hereafter described, the controller 123 may include multiple ASEs that each send status polling commands to respective memory locations. For example, if the storage device 102 includes 32 dies each having 4 planes, the controller 123 may include a single ASE that sends 128 status polling commands (one ASE for all dies and planes), 32 ASEs that each send 4 status polling commands (one ASE for each die), or 128 ASEs that each send a single status polling command (one ASE for each plane).

While the controller 123 is reading data 119 as described above, the ASE 125 (one ASE in this example or multiple ASEs in other examples) may in the background send status polling commands to each memory location 112 to determine whether the data is still being sensed from the cells 116 into the data latches 126 using the sense amplifiers 124 (e.g. the die 114 is in a busy state), or whether the data has been sensed and is ready for transfer from the data latches 126 to the controller 123 (e.g. the die 114 is in a ready state). The ASE 125 may send status polling commands to the memory locations 112 that are currently sensing data from the cells 116 based on a status polling queue. For example, the ASE 125 may populate the status polling queue with memory locations 112 according to an order of read commands received from the host device 104, an order of read operations performed by the controller in each memory location 112, an order of identifiers of each memory location, or according to some other order. The ASE 125 may send status polling commands to each memory location 112 indicated in the status polling queue queue in a round robin manner. For example, the ASE 125 may send a status polling command to each die 114 in the queue that is currently sensing data, one after the other, in circular fashion.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106. The controller 123 (e.g. the ASE 125) may send status polling commands to each memory location 112 while the data is being sensed into the data latches 126.

Figure 3:
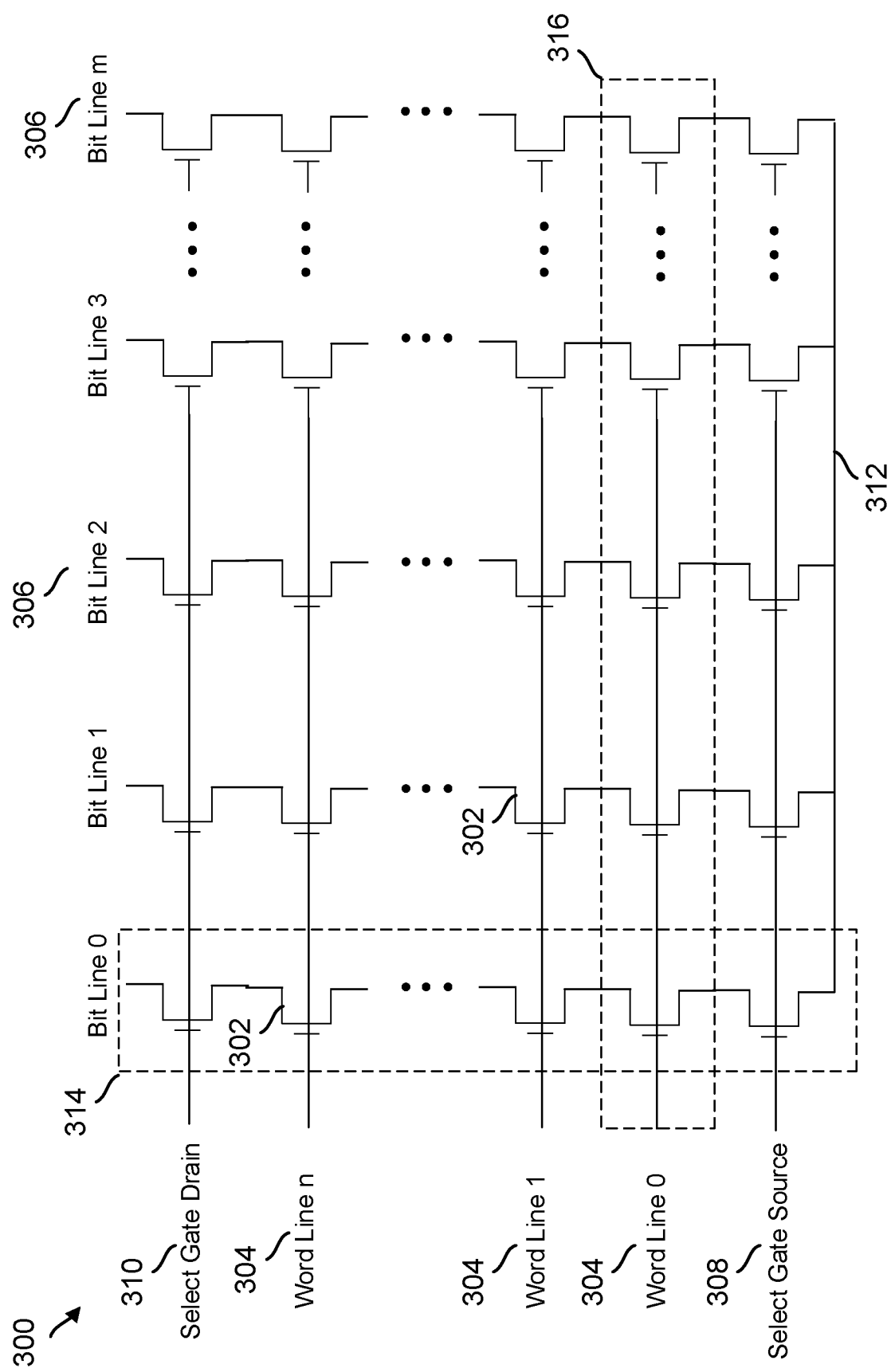
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
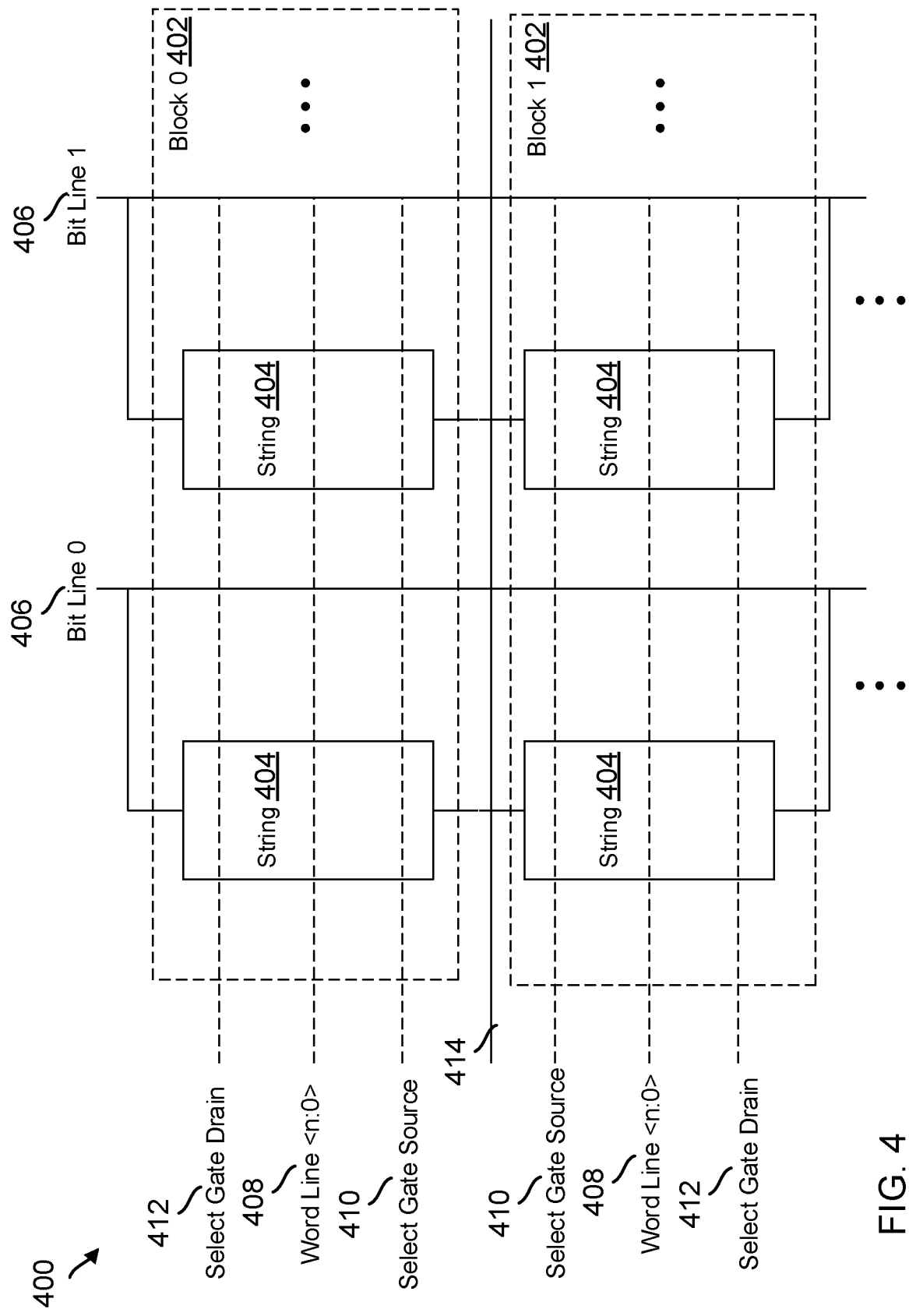
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

Figure 5:
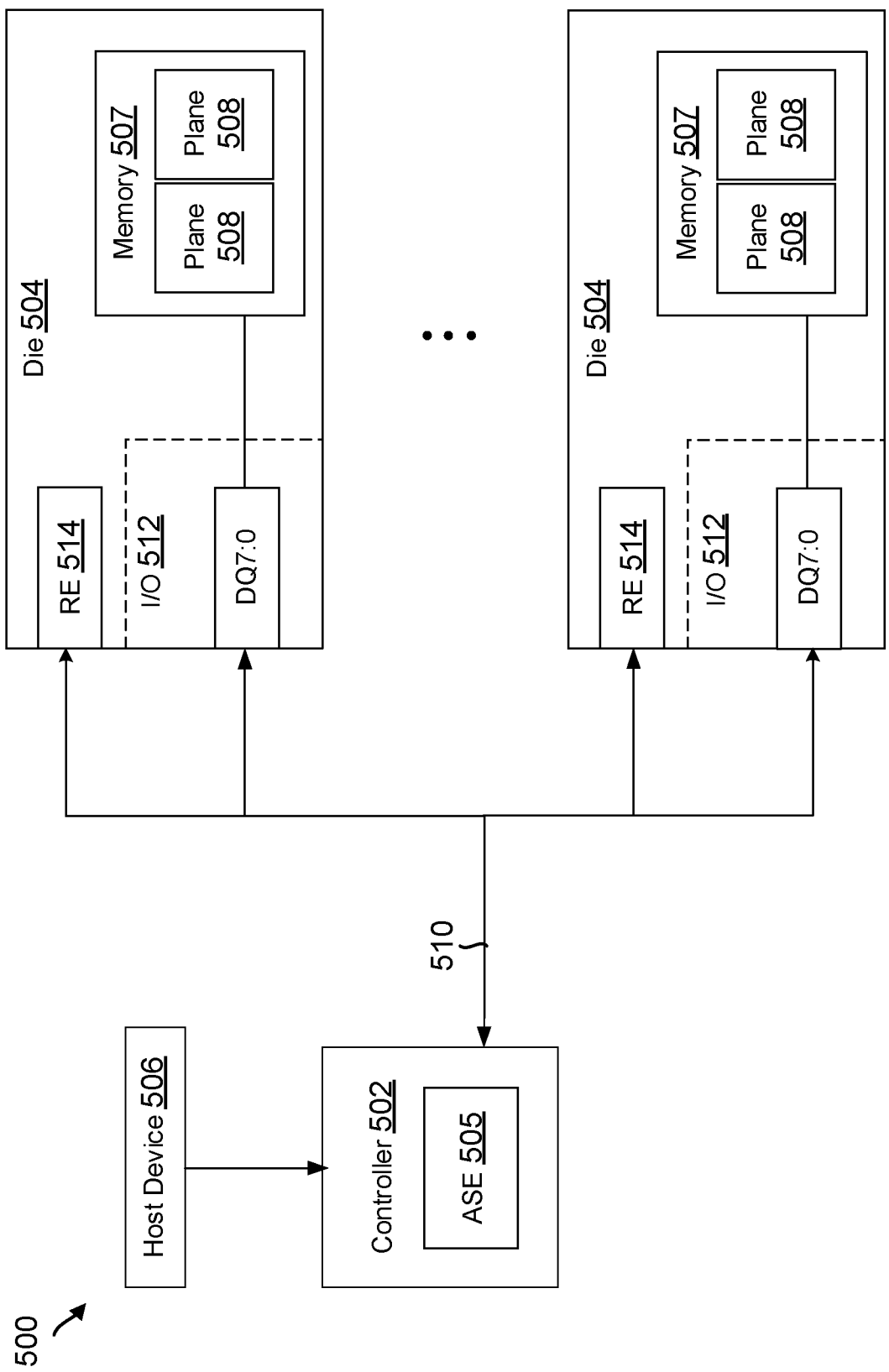
FIG. 5 is a conceptual diagram illustrating an example of a controller that communicates with multiple dies in the storage device of FIG. 1.

FIG. 5 illustrates an example 500 of a controller 502 in communication with multiple dies 504 and with a host device 506. The controller 502 may include an ASE 505. Each die 504 may include a memory 507, and each memory 507 may include planes 508 of blocks (e.g. blocks 402) including multiple cells (e.g. cells 116, 302). The dies 504 or planes 508 may correspond to the memory locations 112 of FIG. 1. The host device 506 may correspond to host device 104 of FIG. 1. The controller 502 may correspond to controller 123 of FIG. 1. The ASE 505 may correspond to ASE 125 of FIG. 1. Although in the example of FIG. 5, the controller 502 is described as including a single ASE, the controller 502 may alternatively include multiple ASEs as previously described.

The controller 502 may communicate with each of the dies 504 over a shared bus 510. Each die 504 may include various pins which serve as interfaces between the controller and the die. For example, each die may include an input/output (I/O) 512 which is configured to receive inputs (e.g. input data and commands from the controller to read, write, or erase data) and transmit outputs (e.g. output data from the memory 507). I/O 512 may include a number of data lines or pins (DQ) that receive individual bits of input data and send individual bits of output data over the shared bus 510. In the example of FIG. 5, shared bus 510 may be an 8-bit bus which interfaces with eight DQ pins (DQ7:0), although a different bus width and number of DQs may be used (e.g. a 16-bit bus with 16 DQs). The die may also include a RE 514 (read enable) for enabling output data buffers, such as for activating the data latches 126 of FIG. 1 to output sensed data via the I/O 512 to the controller. For clarity, only I/O 512 and RE 514 are illustrated in FIG. 5 for each die 504; however each die may include other pins. For instance, each die may include a CE for receiving a chip-enable signal from the controller, a ready/busy (R/B) for outputting a ready or busy status to the controller, an address latch enable (ALE) for latching addresses into NAND, a command latch enable (CLE) for latching commands into a command register, a WE (write enable) for clocking data, addresses, or commands into the NAND, and a bidirectional data strobe signal (DQS) that clocks the I/O to receive and transmit data over the shared bus.

Figure 6:
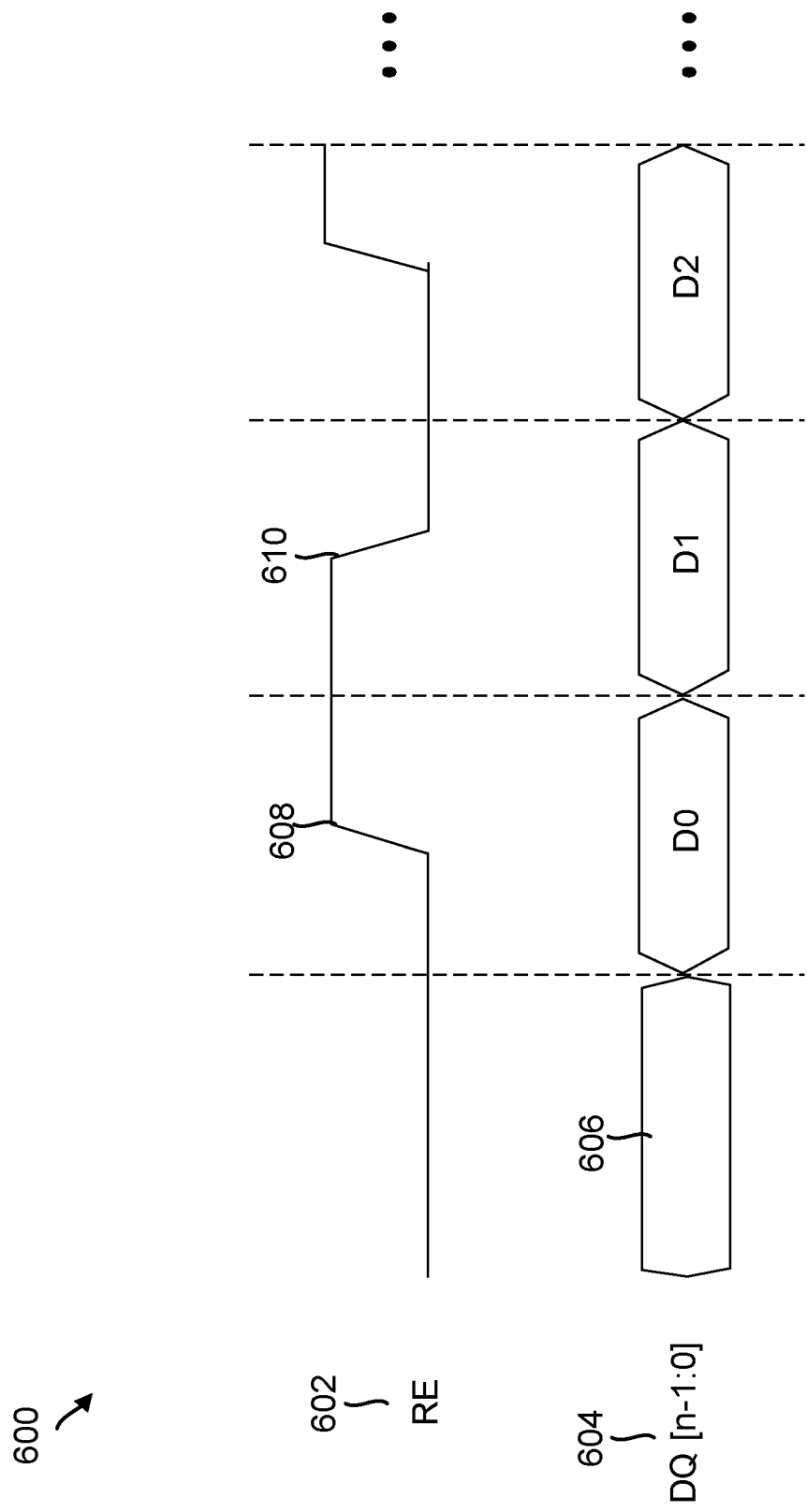
FIG. 6 is a conceptual diagram illustrating an example of DQ and read enable (RE) timings during a read performed by the storage device of FIG. 1.

When the controller 123, 502 reads data 119 from each die 504 as described above, the controller receives output data from the DQs in I/O 512 during each toggle of the RE 514. FIG. 6 illustrates a timing chart 600 depicting an example of this timing relationship between a RE 602 (e.g. RE 514) and n DQs 604 (e.g. DQs in I/O 512) during a read. The value n may be 8 similar to the example of FIG. 5 (e.g. DQ[7:0] corresponding to eight DQs sharing an 8-bit bus), or another number (e.g. 16, etc.). During a time 606, the die may perform internal processing of data to be output to the controller. When the RE 602 toggles at time 608, the controller may receive n bits of data D0 from the DQs 604 (over shared bus 510) sensed in the data latches (e.g. data latches 126). When the RE 602 toggles again at time 610, the controller may receive the next n bits of data D1 from the DQs 604 sensed in the data latches, and the process may repeat for subsequent n bits of data after each toggle of RE 602. The data that is output from the DQs 604 may include host data as well as data indicating die status. For example, the memory 507 of each die 504 may include a status register that stores data (e.g. one or more bits) indicating a die status (e.g. busy or ready), and the data currently in the status register that is stored in the data latches 126 may be output from the DQs 604 in response to toggling of the RE 602.

Figure 7:
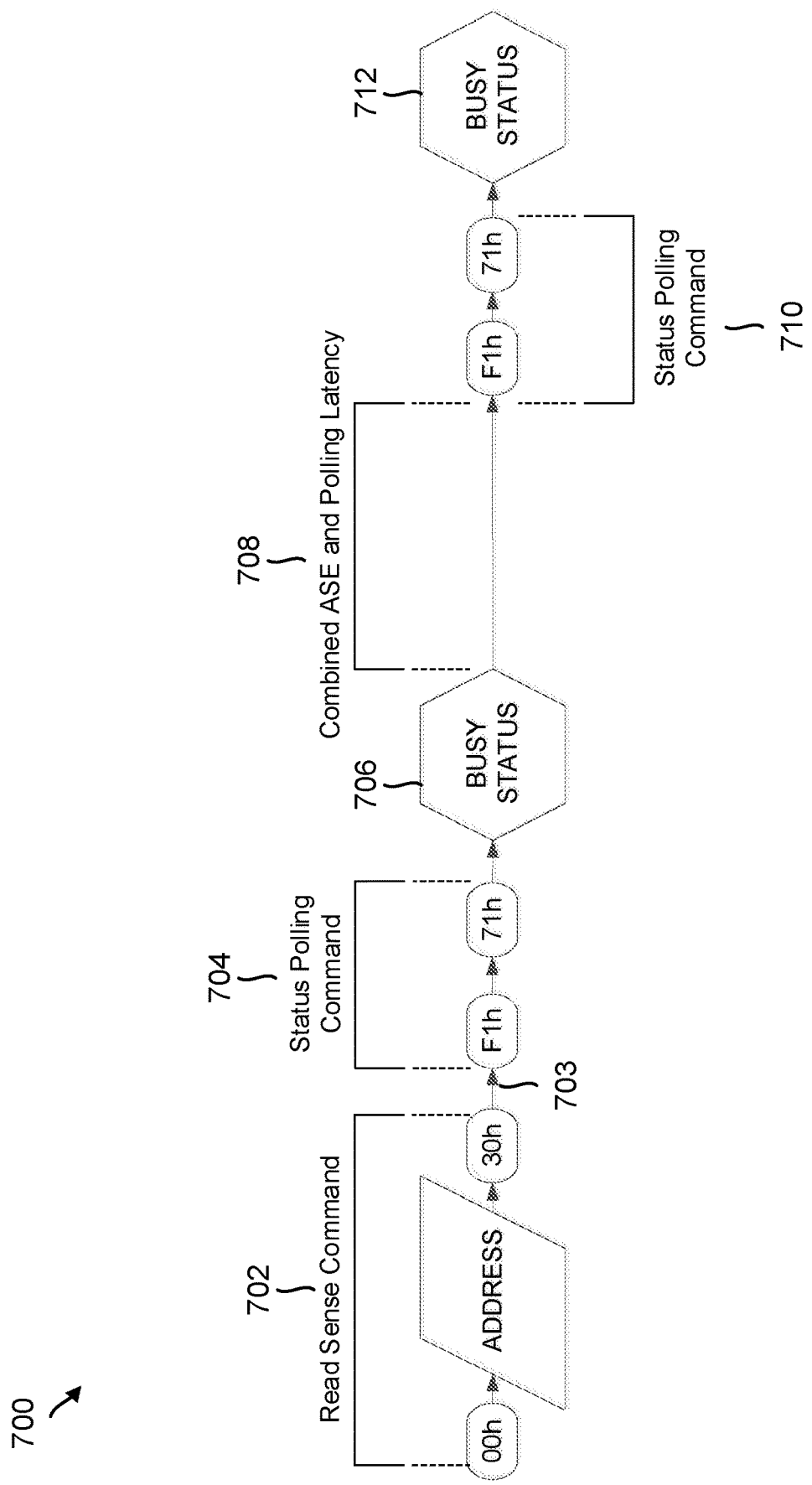
FIG. 7 is a conceptual diagram illustrating an example of a read command sequence in the storage device of FIG. 1.

FIG. 7 illustrates an example 700 of a read command sequence for the controller 123, 502 to read data 119 from one of the dies 114, 504. After the controller receives a read command from the host device 104, 506 to read data from cells 116, 302 in one of the planes 508 of one of the dies, the controller may issue a read sense command 702 to the die. The read sense command 702 may include values (e.g. 00h followed by 30h) indicating to the die that a read is to be performed in a block of the die that is associated with a given physical address 210, in response to which the sense amplifiers 124 may begin sensing data from the cells into the data latches 126. At the same time as or after issuing the read sense command 702, the controller may initiate a status timer that expires before a predicted end of the read operation (the read sense). For instance, if the read sense is expected to take 50 μs, the status timer may expire at or after 45 μs in one example, or some other number in other examples.

After the timer expires (e.g. after time 703), the controller 123, 502 may issue a status polling command 704 to the die 114, 504. For instance, the ASE 125, 505 of the controller may send the status polling command 704 to the die as part of a background task or operation of the controller. The status polling command 704 may include values (e.g. F1h followed by 71h) indicating the die to output a status of a read sense in a given plane (e.g. plane 508). By the time the die receives and processes the status polling command 704, the die may be busy processing the read sense command 702 (e.g. the die may have a busy status 706) and therefore the die may output data to the controller indicating the die is in a busy state. For example, the die may output data to the ASE indicating the busy status 706 via the I/O 512 (e.g. the DQs 604) in response to a toggle of the RE 514, 602. Therefore, during time 708, the ASE (or multiple ASEs) may issue status polling commands to other dies on the shared bus 510 with the controller that are also busy executing respective read sense commands sent by the controller (e.g. in a round robin manner according to a status polling queue). During time 708, the ASE (or multiple ASEs) may also issue status polling commands to the same die for other planes in which respective read sense commands are being executed. After the ASE finishes sending the other status polling commands during time 708, the ASE may send a subsequent status polling command 710 to the die indicating the die to again output a status of the read sense in the given plane. If the die is still in a busy state, the die may again output data to the controller indicating a busy status 712 of the die, and the ASE may again proceed to issue status polling commands to the other dies (or to the same die for other planes) until it returns again to the same die for the same plane as described above. This process may repeat periodically with subsequent status polling commands (e.g. at 1 μs intervals or some other amount of time) until the die eventually outputs to the ASE that it is in a ready state, in which case the controller may issue a transfer command to the die to transfer the host data stored in the data latches 126 to the controller.

However, the time 708 may be long, e.g. where there is a large number of dies and planes processing read sense commands 702 and where the die 114, 504 happens to be the last in a status polling queue of the ASE 125, 505. Therefore, if the die happens to be finished processing the read sense during time 708, then a sizable delay may occur before the controller 123, 502 (e.g. the ASE) finally returns to the die, issues a subsequent status polling command 710, identifies that the die is in a ready state, and issues the transfer command for the data. Such delay may be further increased by the firmware overhead associated with issuing the subsequent status polling command 710 as well as the transfer command. As a result, a sizable read latency may exist in connection with executing the read sense command 702. When such read commands require low read latency (e.g. the commands are high priority), the impact to QoS may be significant.

Accordingly, to reduce the read latency and improve QoS of a read operation in a given die 114, 504 for a given plane, the controller 123, 502 (e.g. the ASE 125, 505) may refrain from sending status polling commands 704 to other dies (or to the same die for other planes) while waiting for the read sense command 702 for the given die and plane to finish execution. In one example, the controller may refrain from sending the other status polling commands by blocking the ASE from communicating with the respective dies. For example, after sending the read sense command 702 to the given die, the controller may indicate to the ASE to send the status polling command 704 to the given die for the given plane, but to pause sending other status polling commands to the other dies (as well as to the given die for other planes) until the read operation is complete. For instance, the controller may block the ASE from sending other status polling commands by using a switch or other circuitry (e.g. if the ASE is implemented in hardware) that prevents the ASE from sending data to the other dies or to the same die for other planes, by using a flag or other parameter (e.g. if the ASE is implemented in firmware or software) to prevent the ASE from moving to a next entry in the status polling queue, or in some other manner. As a result, the time 708 during which other dies or planes are polled may effectively be reduced or eliminated, as the controller may acquire exclusive access to the die over the shared bus 510 by blocking the ASE or preventing other background operations from being performed as described above.

Moreover, after sending the status polling command 704, the controller 123, 502 may toggle the RE 514, 602 to enable the data latches 126 to output the status of the die 114, 504 via the I/O 512. If the die outputs the busy status 706, then the controller may refrain from sending the subsequent status polling command 710 (e.g. by blocking the ASE such as described above), and instead the controller may again toggle the RE to check if the output has changed (e.g. the die is in the ready state). If the die again outputs the busy status 712, then the controller again may toggle the RE and repeat the above process. Accordingly, the controller may continuously toggle the RE to continuously read the die status, without sending subsequent status polling commands 710, until the read operation is complete and the die outputs the ready state. As a result, the additional firmware overhead or latency associated with issuing the subsequent status polling commands 710 may also be reduced or eliminated.

Additionally, the controller 123, 502 may send the transfer operation command along with the read sense command 702 or the status polling command 704. For example, the controller may include, in the read sense command 702 or the status polling command 704, an indication to transfer sensed data upon read completion, e.g. by setting a flag or changing some other parameter of the command 702 or 704 to indicate a transfer is to be performed immediately when the sensed data is latched. As a result, in response to the die switching to the ready state as described above, the die may immediately transfer the data to the controller without waiting for the controller to issue a subsequent transfer command. In this way, the additional firmware overhead or latency associated with issuing a transfer command may also be reduced or eliminated.

Figure 8:
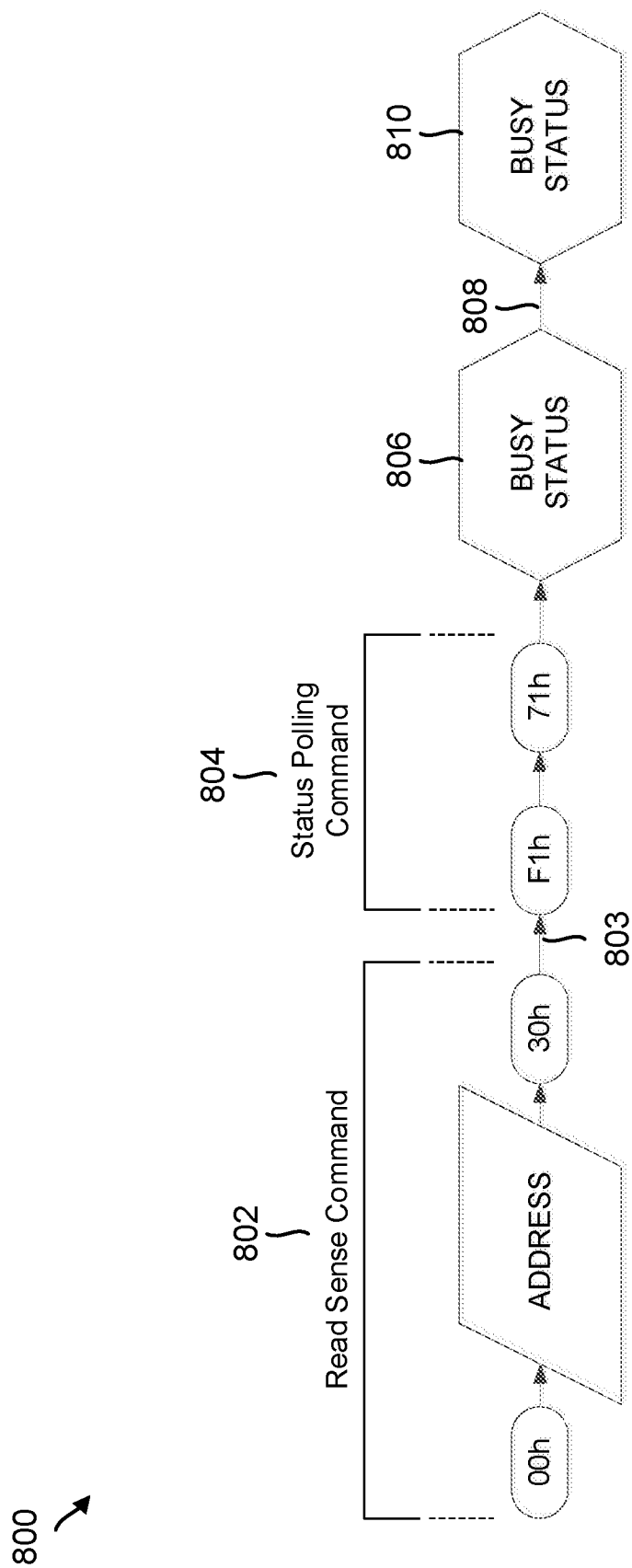
FIG. 8 is a conceptual diagram illustrating an example of a read command sequence in the storage device of FIG. 1 that results in reduced read latency.

FIG. 8 illustrates an example 800 of a read command sequence for the controller 123, 502 to read data 119 from one of the dies 114, 504 with reduced latency (e.g. due to blocking of the ASE 125, 505 and further latency reductions as described above). After the controller receives a read command from the host device 104, 506 to read data from cells 116, 302 in one of the planes 508 of one of the dies, the controller may issue a read sense command 802 to the die. The read sense command 802 may include values (e.g. 00h followed by 30h) indicating to the die that a read is to be performed in a block of the die that is associated with a given physical address 210, in response to which the sense amplifiers 124 may begin sensing data from the cells into the data latches 126. At the same time as or after issuing the read sense command 802, the controller may initiate a status timer that expires before a predicted end of the read sense. For instance, if the read operation is expected to last 50 μs, the status timer may expire at or after 45 μs, or some other number.

After the timer expires (e.g. after time 803), the controller 123, 502 may issue a status polling command 804 to the die 114, 504. For instance, the ASE 125, 505 may send the status polling command 804 to the die for a given plane, while refraining from sending status polling commands to other dies or to the same die for other planes (e.g. due to ASE blocking as described for example above). Thus, where multiple ASEs are used, one ASE may send the status polling command 804 to the die while the same ASE or other ASEs may refrain from sending other status polling commands for the other dies or planes. The status polling command 804 may include values (e.g. F1h followed by 71h) indicating the die to output a status of a read sense in a given plane (e.g. plane 508). The status polling command 804 (and/or read sense command 802) may also include an indication to transfer the sensed data in the data latches 126 when the read sense command 802 is completely executed. By the time the die receives and processes the status polling command 804, the die may be busy processing the read sense command 802 (e.g. the die may have a busy status 806) and therefore the die may output data to the controller indicating the die is in a busy state. For example, the die may output data to the ASE indicating the busy status 806 via the I/O 512 (e.g. the DQs 604) in response to a toggle of the RE 514, 602. Therefore, during time 808, the controller may again toggle the RE 514, 602 to read the die status of the read sense in the given plane. If the die is still in a busy state, the die may again output data to the controller indicating a busy status 810 of the die, and the controller may again toggle the RE to read the die status of the read sense in the given plane. The controller may repeat the above process multiple times by continuously toggling the RE until the die eventually outputs that it is in a ready state, in which case the die may immediately transfer the data stored in the data latches 126 to the controller.

As a result, the controller may continuously toggle RE 514, 602 until the die status for a given die or plane is ready without incurring additional read latency due to ASE delays (e.g. in identifying polling orders and reading die statuses), polling delays (e.g. in sending status polling commands to other dies or planes), and commanding delays (e.g. in sending subsequent status polling commands to the same die for the same plane, as well as in sending separate transfer operation commands). By eliminating the subsequent status polling commands 710, the time 708 between die status outputs may reduce to time 808, for example, from an average of 500 ns (or almost 1 µs worst-case) to approximately 10 or 20 ns depending on the RE toggle rate. For instance, if the read sense command 802 is associated with a high priority read, the controller may toggle the RE 514, 602 at faster rates to result in even smaller read latencies (e.g. 10 ns between busy statuses 806, 810) than if the read sense command is not associated with a high priority read, in which case the controller may toggle the RE 514, 602 at slower rates (e.g. 20 ns between busy statuses 806, 810). By blocking the ASE 125, 505 (or multiple ASEs) from sending status polling commands to other dies or to the given die for other planes, the controller may have exclusive use of the shared bus 510 for the given die and plane and be able to read the die status by toggling the RE without sending periodic status polling commands. The controller may thus prevent command interlacing on the channel or shared bus 510 between the different dies or die planes and maintain control of the channel continuously or contiguously throughout the entire status polling operation. For instance, the RE toggling may be the only foreground operation that is performed on the channel. Thus, read latencies may be reduced and QoS may be improved.

Figure 9:
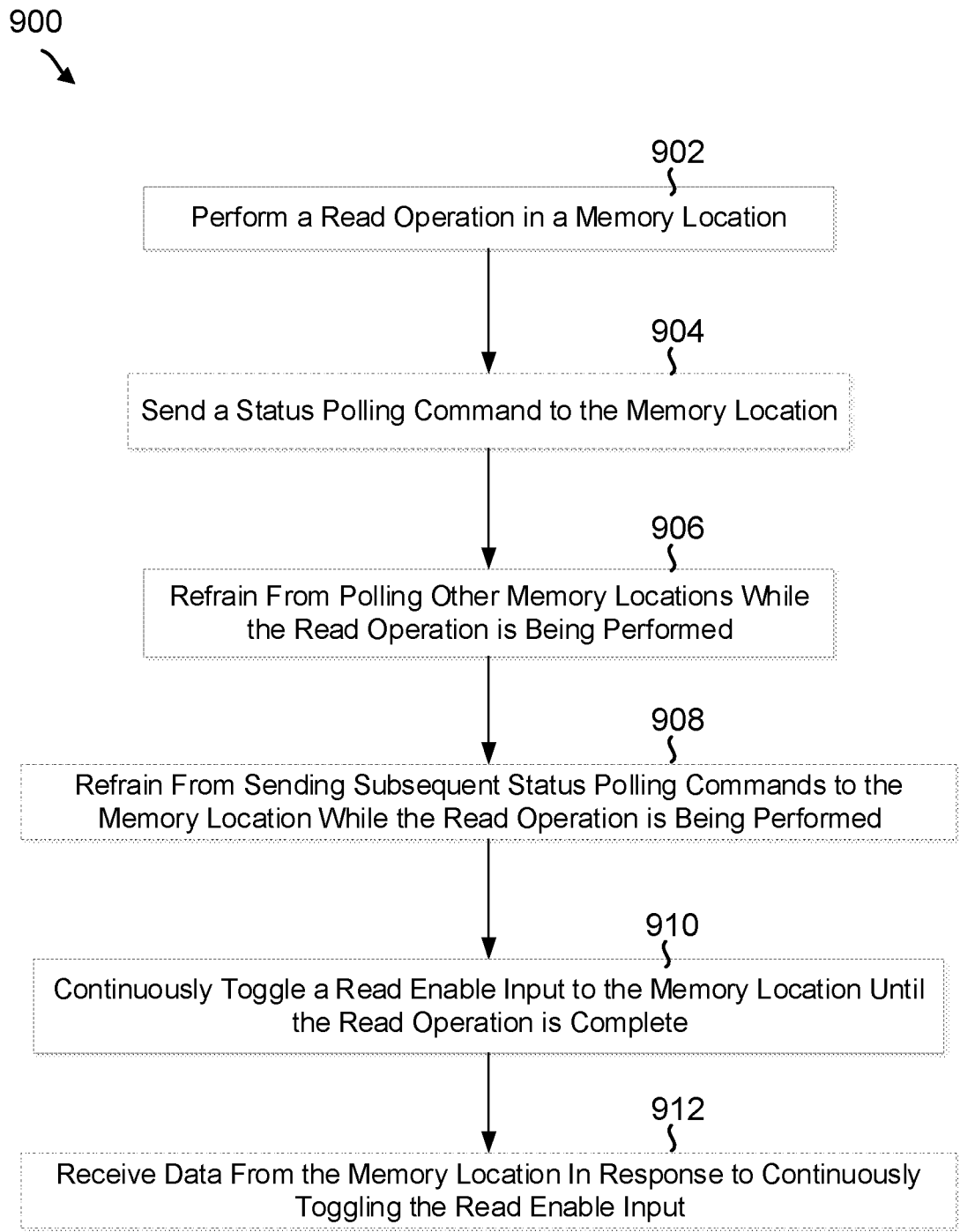
FIG. 9 is a flow chart illustrating a method for reducing read latency by the storage device of FIG. 1.

FIG. 9 illustrates an example flow chart 900 of a method for reducing read latency in dies. For example, the method can be carried out in a storage device 102 such as the one illustrated in FIG. 1. Each of the steps in the flow chart can be controlled using the controller as described below (e.g. controller 123, 502), or by some other suitable means. Optional aspects are illustrated in dashed lines.

As represented by block 902, the controller may perform a read operation in one of the memory locations of a memory. In one example, the memory may comprise a plurality of dies each comprising a different one of the memory locations. In another example, the memory may comprise a plurality of planes each comprising a different one of the memory locations. For example, referring to FIGS. 1, 3-5, 7 and 8, the controller 123, 502 may send a read sense command 702, 802 to die 114, 504 to read data 119 stored in cells 116, 302 of a block 402 of a plane 508 in memory 507.

As represented by block 904, the controller may send a status polling command to the one of the memory locations. A shared bus may exist between the controller and the memory locations. For example, referring to FIGS. 1, 5, 7 and 8, the controller 123, 502 may send a status polling command 704, 804 to die 114, 504 over a shared bus 510 between the controller and multiple dies.

As represented by block 906, the controller may refrain from polling any of the other memory locations while the read operation is being performed. In one example, the controller may comprise an ASE that is configured to send a status polling command associated with one of the other memory locations, and the controller may block the ASE from sending the status polling command. For example, referring to FIGS. 1, 5, 7 and 8, the controller 123, 502 may refrain from sending the status polling command 704, 804 to other dies than die 114, 504 over the shared bus 510 during execution of the read sense command 702, 802. For instance, if 32 dies coupled to the shared bus 510 are simultaneously executing respective read sense commands, the controller may allow the ASE 125, 505 to send a status polling command to die 1 but may block the ASE from sending status polling commands to dies 2-32.

As represented by block 908, the controller may refrain from sending subsequent status polling commands to the one of the memory locations while the read operation is being performed. For example, referring to FIGS. 1, 5, 7 and 8, the controller 123, 502 may refrain from sending subsequent status polling commands 710 to the die 114, 504 during execution of the read sense command 702, 802. For instance, the controller may allow the ASE 125, 505 to send status polling command 704, 804 to die 1, but during time 708, 808, the controller may block the ASE from sending subsequent status polling commands 710 to die 1 while the die has a busy status 706, 712, 806, 810.

As represented by block 910, the controller may continuously toggle a read enable input to the one of the memory locations until the read operation is complete. The controller may send the status polling command at block 904 after sending the read sense command and prior to continuously toggling the read enable input. In one example, the controller may wait a period of time after sending the status polling command before continuously toggling the read enable input. For example, referring to FIGS. 1, 5, 6 and 8, the controller may continuously toggle RE 514, 602 to the die 114, 504 until execution of read sense command 802 is complete (e.g. the data stored in plane 508 has been sensed into the data latches 126 in response to the read sense command). For instance, after sending the read sense command 802, waiting a period of time 803, and sending the status polling command 804, the controller may continuously toggle the RE during time 808 until the die 114, 504 no longer has a busy status 806, 810.

Finally, as represented by block 912, the controller may receive data from the one of the memory locations in response to continuously toggling the read enable input, completed execution of the read sense command, or the one of the memory locations being no longer in a busy state. For example, referring to FIGS. 1, 3, 5, 6 and 8, when the controller 123, 502 sends either the read sense command 802 or the status polling command 804 to the die 114, 504, the controller may indicate in the command to transfer the data to the controller immediately after the sensing is finished, without requiring a separate transfer command. Accordingly, while the die is in the busy state, the controller 123, 502 may continuously toggle the RE 514, 602 as described above until the controller reads a die status indicating the die 114, 504 is in a ready state and that the read sense command 802 has completed execution (e.g. the data 119 has been sensed from the cells 116, 302 in plane 508 using the sense amplifiers 124 into the data latches 126). As a result, the controller may subsequently receive the data 119 from the die over the shared bus 510.

Accordingly, the storage device described in the present disclosure may reduce read latency and improve QoS for high priority or high performance reads by avoiding ASE delays (e.g. in identifying polling orders and reading die statuses), polling delays (e.g. in sending status polling commands to other dies or planes), and commanding delays (e.g. in sending subsequent status polling commands to the same die for the same plane, as well as in sending separate transfer operation commands). By eliminating the subsequent status polling commands, the time between die status outputs may reduce depending on the RE toggle rate. Moreover, by blocking the ASE from sending status polling commands to other dies or to the given die for other planes, the controller may have exclusive use of the shared bus for the given die and plane. The controller may thus prevent command interlacing on the channel between the different dies or die planes.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a memory comprising a plurality of memory locations; and
a controller coupled to the memory and configured to:
perform a read operation in a first memory location of the plurality of memory locations over a shared bus between the controller and the plurality of memory locations,
refrain from polling a second memory location of the plurality of memory locations over the shared bus while the read operation is being performed, and
continuously toggle a read enable input to the first memory location over the shared bus while the polling of the second memory location is refrained and until the read operation is complete to obtain a status of the read operation independent of subsequent polling of the first memory location.

2. The storage device of claim 1, wherein the memory comprises a plurality of dies each comprising a different one of the plurality of memory locations.

3. The storage device of claim 1, wherein the memory comprises a plurality of planes each comprising a different one of the plurality of memory locations.

4. The storage device of claim 1, wherein the controller comprises an asynchronous status engine (ASE) that is configured to send a status polling command associated with one of the plurality of memory locations.

5. The storage device of claim 4, wherein the controller is configured to block the ASE from sending the status polling command.

6. The storage device of claim 1, wherein the controller is configured to send a status polling command to the first memory location prior to continuously toggling the read enable input.

7. The storage device of claim 6, wherein the controller is further configured to wait a period of time after sending the status polling command before continuously toggling the read enable input.

8. The storage device of claim 6, wherein the controller is further configured to refrain from sending subsequent status polling commands to the first memory location while the read operation is being performed.

9. The storage device of claim 1, wherein the controller is further configured to receive data from the first memory location in response to continuously toggling the read enable input.

10. A storage device, comprising:
a memory comprising a plurality of memory locations; and
a controller coupled to the memory and configured to send a read sense command to one of the plurality of memory locations over a shared bus between the controller and the plurality of memory locations, to refrain from sending a status polling command to any other memory locations in the plurality of memory locations over the shared bus during execution of the read sense command, and to continuously toggle a read enable input to the one of the plurality of memory locations over the shared bus while polling of the other memory locations is refrained and until the execution of the read sense command is complete to obtain a status of the read sense command independent of subsequent polling of the one of the plurality of memory locations.

11. The storage device of claim 10, wherein the controller is configured to send the status polling command to the one of the plurality of memory locations after sending the read sense command and before continuously toggling the read enable input.

12. The storage device of claim 11, wherein the controller is further configured to continuously toggle the read enable input at a period of time after sending the status polling command.

13. The storage device of claim 11, wherein the controller is further configured to refrain from sending subsequent status polling commands to the one of the plurality of memory locations during the execution of the read sense command.

14. The storage device of claim 10, wherein the controller is further configured to receive data from the one of the plurality of memory locations in response to completed execution of the read sense command.

15. A storage device, comprising:
a memory comprising a plurality of memory locations; and
a controller coupled to the memory and configured to send a read sense command to one of the plurality of memory locations over a shared bus between the controller and the plurality of memory locations, to refrain from sending a status polling command to any other memory locations in the plurality of memory locations over the shared bus while the one of the plurality of memory locations is in a busy state, and to continuously toggle a read enable input to the one of the plurality of memory locations over the shared bus while polling of the other memory locations is refrained and until the one of the plurality of memory locations is no longer in the busy state to obtain a status of the read sense command independent of subsequent polling of the one of the plurality of memory locations.

16. The storage device of claim 15, wherein the controller is configured to send the status polling command to the one of the plurality of memory locations after sending the read sense command.

17. The storage device of claim 16, wherein the controller is further configured to send the status polling command at a period of time before continuously toggling the read enable input.

18. The storage device of claim 16, wherein the controller is further configured to refrain from sending subsequent status polling commands to the one of the plurality of memory locations while the one of the plurality of memory locations is in the busy state.

19. The storage device of claim 15, wherein the controller is further configured to receive data from the one of the plurality of memory locations in response to the one of the plurality of memory locations being no longer in the busy state.

* * * * *